US005940972A

United States Patent [19]

Baris et al.

[11] Patent Number: 5,940,972

[45] Date of Patent: Aug. 24, 1999

[54] ROTARY KNIFE BLADE

[75] Inventors: Robert Baris, Cleveland; Jeffrey Whited, Amherst, both of Ohio

[73] Assignee: Bettcher Industries, Inc., Birmingham, Ohio

[21] Appl. No.: 08/898,761

[22] Filed: Jul. 23, 1997

Related U.S. Application Data

[63] Continuation-in-part of application No. 08/672,839, Jun. 28, 1996, Pat. No. 5,692,307.

[51] Int. Cl.[6] .................................................. A22C 17/04

[52] U.S. Cl. ............................ 30/276; 452/137; 452/149; 30/347; 30/355

[58] Field of Search ............................ 30/276, 347, 355; 452/137, 149, 133, 164

[56] References Cited

U.S. PATENT DOCUMENTS

| | | | |
|---|---|---|---|
| 412,100 | 10/1889 | Knapp | 30/316 |
| 773,118 | 10/1904 | Carter . | |
| 2,171,604 | 9/1939 | Segal . | |
| 2,531,841 | 11/1950 | Cashin | 30/347 |
| 2,564,451 | 8/1951 | Sandberg et al. . | |
| 2,654,430 | 10/1953 | Csigi . | |
| 3,176,397 | 4/1965 | Schuhmann | 30/347 |
| 3,203,295 | 8/1965 | Sauer | 30/355 |
| 3,269,010 | 8/1966 | Bettcher | 30/347 |
| 3,308,703 | 3/1967 | Sauer . | |
| 3,346,956 | 10/1967 | Wezel et al. | 30/355 |
| 3,496,618 | 2/1970 | Como . | |
| 4,002,092 | 1/1977 | Smith et al. . | |
| 4,027,390 | 6/1977 | Kendzior . | |
| 4,250,622 | 2/1981 | Houle . | |
| 4,277,891 | 7/1981 | Dick | 30/355 |
| 4,575,938 | 3/1986 | McCallough | 30/276 |
| 4,637,140 | 1/1987 | Bettcher | 30/276 |
| 4,854,046 | 8/1989 | Decker et al. | 30/264 |
| 4,891,885 | 1/1990 | Fischer et al. | 30/355 |
| 4,899,742 | 2/1990 | Muller . | |
| 5,022,299 | 6/1991 | Fischer et al. | 30/366 |
| 5,254,031 | 10/1993 | Balke . | |
| 5,445,561 | 8/1995 | Elmer . | |
| 5,692,307 | 12/1997 | Whited et al. | 30/276 |
| 5,761,817 | 6/1998 | Whited et al. | 30/347 |

FOREIGN PATENT DOCUMENTS

| | | | |
|---|---|---|---|
| 0477761 A2 | 4/1992 | European Pat. Off. . | |
| 2437275 | 4/1980 | France . | |
| 964031 | 5/1957 | Germany . | |
| 1611733 | 3/1968 | Germany . | |
| 886832 | 1/1962 | United Kingdom | 30/355 |

OTHER PUBLICATIONS

P. 3 of publication entitled *Cook's Illustrated*, dated Nov./Dec. 1995 (one page).

*Primary Examiner*—Hwei-Siu Payer

*Attorney, Agent, or Firm*—Watts Hoffmann Fisher & Heinke

[57] ABSTRACT

A rotary knife having a blade with an annular body rotatable about a central axis and an annular blade section projecting away from the body. The blade section comprises a first radially inner surface, a second radially outer surface and, a cutting edge defined along the projecting end of the blade section and extending about the central axis. The cutting edge defines a sinuous line extending about the central axis forming first curved segments having radii of curvature centered radially inwardly from the edge, second curved segments interposed between adjacent first segments and having radii of curvature centered radially outwardly from the edge, and a blade edge curvature inflection location between each adjacent first and second segments.

8 Claims, 4 Drawing Sheets

Fig.3
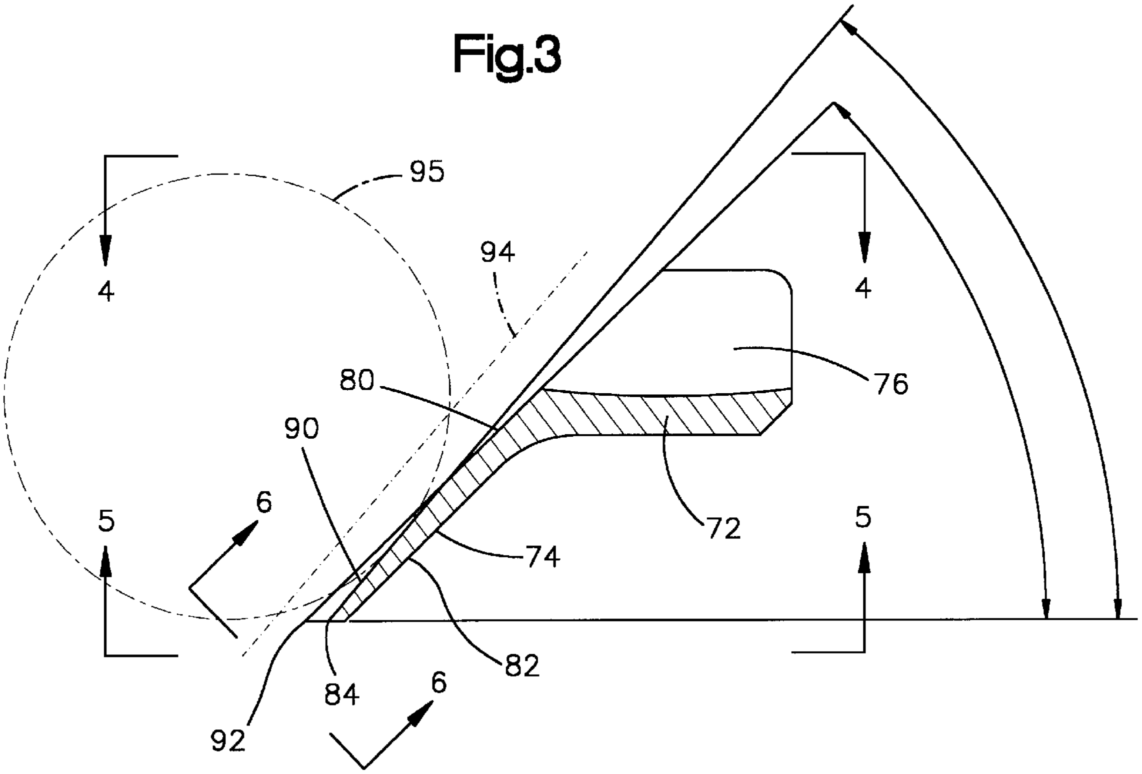
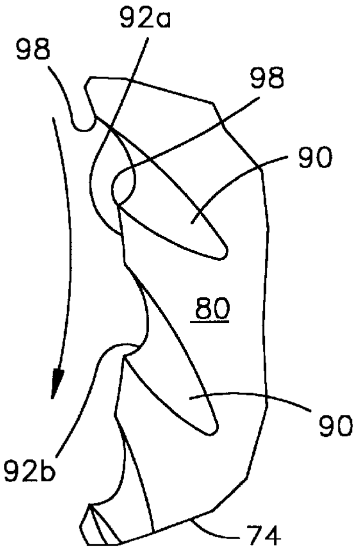
Fig.4
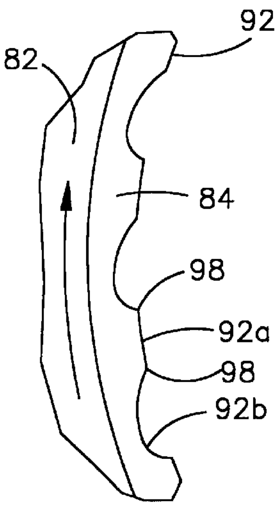
Fig.5
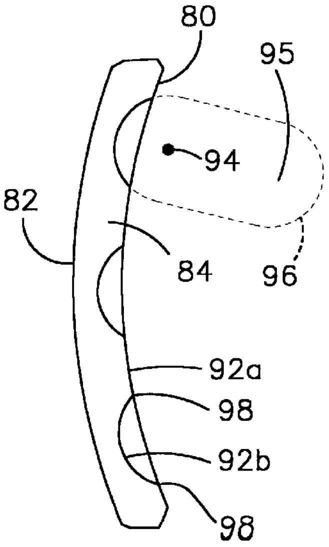
Fig.6

ROTARY KNIFE BLADE

RELATE BACK

This is a continuation-in-part of co-pending U.S. application Ser. No. 08/672,839, filed Jun. 28, 1996, now U.S. Pat. No. 5,692,307 entitled ROTARY KNIFE BLADE.

FIELD OF THE INVENTION

The present invention relates to power operated rotary knives and more particularly to a power operated rotary knife having a blade defining a sinuous cutting edge disposed annularly about an axis.

BACKGROUND OF THE INVENTION

Power operated rotary knives have been in wide spread use for meat cutting in meat packing and commercial food service facilities. These knives have usually comprised a handle and an annular blade holder for respectively housing a motor and a rotary knife blade. The knife blade was annular and driven about a central axis by the motor via gearing.

The knife blade comprised a body carried by the blade holder and a blade section projecting from the blade holder. The blade body was a continuous ring received by a circular slot in the blade holder. Gear teeth projected away from the blade body to form a ring gear running in mesh with a drive pinion gear. The knife blade sections were usually frustoconical and had a circular blade edge formed by the intersection of smooth, machined blade section surfaces.

The present invention provides a new and improved rotary knife blade having a sinuous edge annularly disposed about an axis and so constructed and arranged that operator effort required for cutting meat and similar materials is reduced, the blade drive motor loads created by cutting are minimized and the blade remains sharper longer.

SUMMARY OF THE INVENTION

The present invention provides a rotary knife blade comprising an annular body rotatable about a central axis and an annular blade section projecting away from the body. The blade section comprises a first radially inner surface, a second radially outer surface and, a cutting edge defined along the projecting end of the blade section and extending about the central axis. The cutting edge defines a sinuous line extending about the central axis forming first curved segments having radii of curvature centered radially inwardly from the edge, second curved segments interposed between adjacent first segments and having radii of curvature centered radially outwardly from the edge, and a blade edge curvature inflection location between each adjacent first and second segments.

In a preferred embodiment an array of shallow flutes is formed in one of the surfaces. The flutes are disposed circumferentially about the blade section, extending from the edge toward the body.

In a preferred embodiment of the invention the first and second surfaces are frustoconical and a third annular surface extends between them remote from the body. The flutes are formed in the first surface and open in the first and third surfaces. The junctures of the third surface with the first surface and the flutes define the cutting edge.

Other features and advantages of the invention will become apparent from the following description of a preferred embodiment made in reference to the accompanying drawings, which form a part of the specification.

BRIEF DESCRIPTION OF THE DRAWINGS

FIG. 3 is an enlarged fragmentary cross sectional view of part of the knife blade shown in FIG. 1 seen approximately from the plane indicated by the line 3—3 of FIG. 1;

FIG. 4 is a view seen approximately from the plane indicated by the line 4—4 of FIG. 3;

FIG. 5 is a view seen approximately from the plane indicated by the line 5—5 of FIG. 3;

FIG. 6 is a view seen approximately from the plane indicated by the line 6—6 of FIG. 3;

DESCRIPTION OF THE BEST KNOWN MODE FOR PRACTICING THE INVENTION

Figure 1:
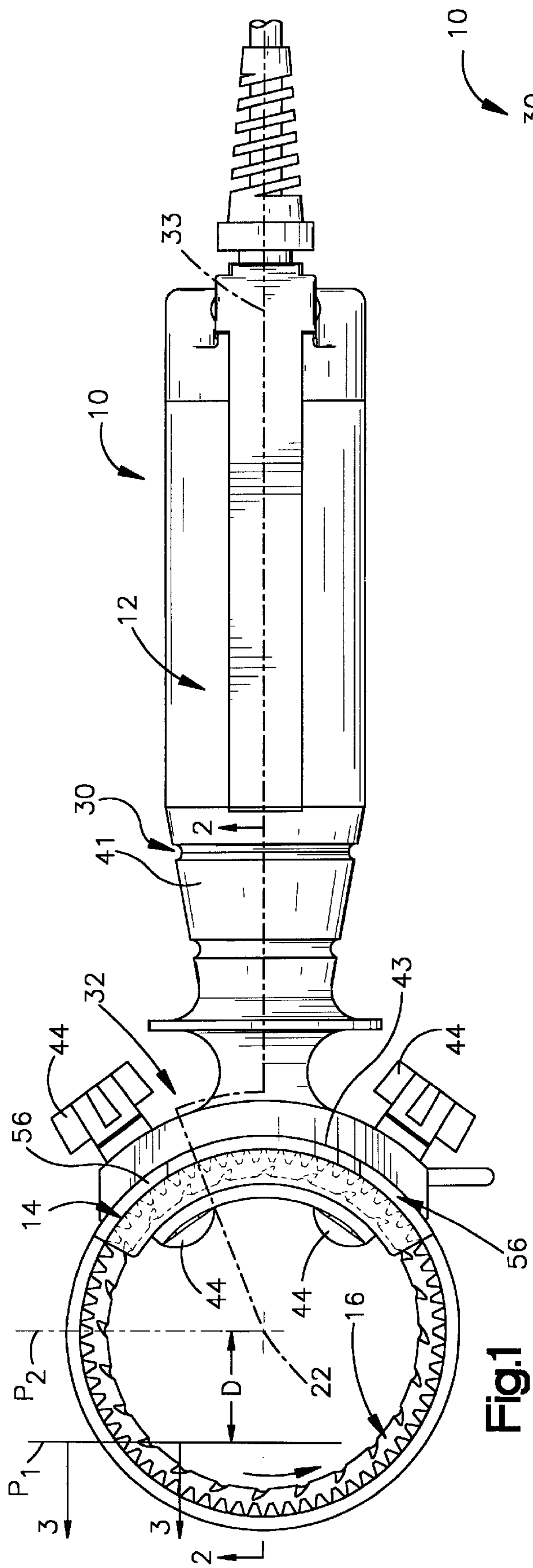
FIG. 1 is a top plan view of a power operated knife incorporating a blade constructed according to the invention.
Figure 2:
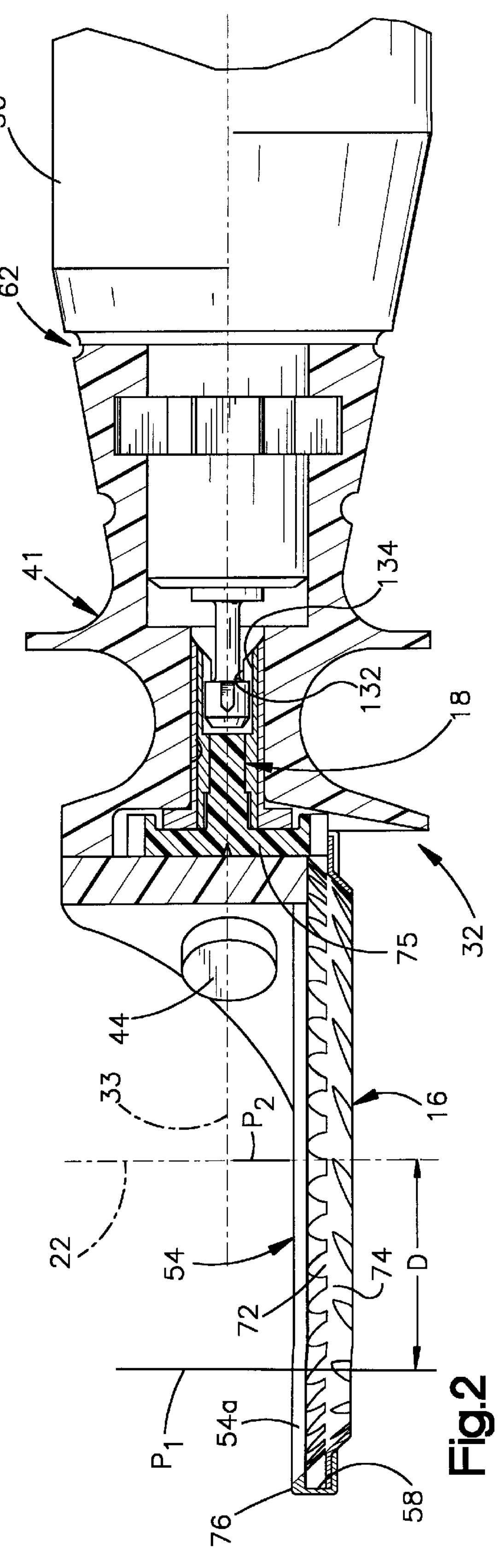
FIG. 2 is an enlarged fragmentary view seen approximately from the plane indicated by the line 2—2 of FIG. 1.

A rotary power operated knife 10 incorporating a blade constructed according to the invention is illustrated in FIG. 1 of the drawings as comprising a handle assembly 12, a ring-like blade housing 14 carried by and projecting from the handle assembly, a ring blade 16 carried by the housing 14, and a blade drive transmission 18 (FIG. 2). The blade housing 14 and blade 16 are disposed about a central axis 22. The blade 16 is driven about the axis relative to the blade housing 14 by the drive transmission 18.

The knife 10 is of a type used in meat packing factories, or the like, for trimming and boning carcasses. The knife 10 is grasped by an attendant and turned "on" so that the blade 16 is driven. The attendant works the knife along a carcass to trim or bone it. The knife 10 is shown for illustrative purposes since the invention can be embodied in rotary knives adapted for other tasks.

The illustrated knife is operated by an electric motor (not illustrated) housed in the handle assembly 12 and connected to a suitable power supply. While an electric motor driven knife is illustrated, it should be appreciated that other kinds of drives may be employed, for example, a remote electric motor or air motor with a flexible drive shaft extending to the knife; a handle mounted air motor with pressurized air supplied through a flexible hose, etc.

The handle assembly 12 houses the blade drive transmission 18, serves as a support for the remaining knife components and provides a comfortable hand piece for the attendant. The preferred handle assembly 12 comprises a manually grippable handle 30 and a head piece 32 for securing the blade housing and blade to the handle assembly.

The illustrated handle 30 is an elongated element shaped so that it can be manually gripped for manipulating the knife over an extended period of time with the knife operator experiencing minimum discomfort or fatigue. In the illustrated knife the handle 30 is generally cylindrical, tubular and projects from the head piece 32 along a longitudinal axis 33. The blade driving motor is mounted in the tubular handle 30.

The head piece 32 anchors the blade housing 14 and blade 16 to the handle assembly. The illustrated head piece comprises a blade housing seat assembly 40 and a shank 41 extending from the seat assembly to the handle 30. The shank 41 defines a socket-like open end for receiving the handle 30. A bayonet type coupling is formed by the shank socket and the projecting handle end so that the two are detachable. The seat assembly 40 comprises a semicircular blade housing seat 43 and connectors 44 for securing the blade housing 14 to the seat. In the illustrated knife, two connectors, each formed by a nut and bolt assembly extending through holes in the seat 43 and blade housing, securely clamp the blade housing to the seat.

The blade housing 14 firmly supports the blade 16 against forces applied during the meat trimming operations yet insures low friction blade rotation about the axis 22 and facilitates easy blade removal and replacement. The blade housing 14 comprises a thin circularly curved blade support 54 (FIG. 2) projecting away from the handle assembly 12 in a plane normal to the axis 22 and a semi-cylindrical, split base 56 extending axially from a portion of the blade support periphery for securing the blade housing to the head piece. The blade housing 14 is clamped against the seat 43 by the connectors 44, which extend through holes in the base 56 and the seat 43. The seat 43 defines locating ribs (not illustrated) extending into respective conforming grooves in the base 56 when the base is properly positioned on the seat.

The blade support 54 expands to enable easy blade removal and replacement when the base split is enlarged. The blade support 54 has a radially inwardly facing side 54*a* and defines a blade-receiving groove 58 opening radially inwardly in the side 54*a* and extending substantially completely about the blade support 54. The blade is inserted in, and removed from, the support 54 by sliding it into and out of the groove 58 when the blade housing split ends are manually separated and held apart. The groove 58 has a generally rectilinear cross sectional shape with the blade support 54 defining a generally "U" shaped cross section. The groove 58 supports the ring blade 16 somewhat loosely with little friction.

The ring blade 16 is driven about its central axis 22 by the motor via the drive transmission 18 so that as the knife moves through the meat the blade readily slices it. The ring blade comprises an annular body 72 disposed about the central axis 22 and an annular blade section 74 projecting from the body. In the illustrated embodiment of the invention (FIG. 2) the transmission 18 comprises a spur gear 75 rotatably supported by the head piece, and a ring gear defined by a plurality of gear teeth 76 projecting away from the body 72 in the direction of extent of the axis 22. The spur gear rotates about the axis 33 (disposed normal to the axis 22) and meshes with the ring gear so that when the motor operates, the spur gear 75 drives the ring gear about the axis 22. While the ring gear is illustrated as formed continuously with the ring blade body 72, the ring gear can be formed from a separate member and fixed to the ring blade.

The blade section 74 is so constructed and arranged that it slices through the meat with great efficiency, minimizing both operator effort and the frictional forces resisting slicing, while maximizing the time between blade sharpenings. Referring to FIGS. 3–6, the blade section 74 comprises a first, radially inner surface 80, a second, radially outer surface 82, and a cutting edge 92 defined along a projecting end of the blade section. The cutting edge 92 forms a sinuous line extending about the central axis 22. In the blade illustrated by FIGS. 1–3, a third surface 84 extends between the first and second surfaces remote from the body. A plurality of flutes 90 forms part of one of the first and second blade section surfaces.

The illustrated blade section 74 projects axially from the blade support 54 and radially inwardly toward the axis 22. The inner and outer surfaces 80, 82 are concentric about the axis 22, frustoconical and extend parallel to each other from the body 72. The blade section 74 thus forms a thin frustoconical wall projecting from the blade body. The third surface 84 is disposed in a plane that is normal to the axis 22. The surfaces 80 and 84 intersect at an acute angle with their intersections forming the blade cutting edge 92.

The flutes 90 are spaced circumferentially about the blade section and extend from the projecting blade section end toward the body 72. In the preferred embodiment of the invention the flutes are defined by smoothly arcuate depressions in the surface 80. The flutes have their maximum depths at their intersections with the surface 84 and become progressively shallower proceeding away from the surface 84. The illustrated flutes open in the surfaces 80, 84. The blade cutting edge 92 is defined by the junctures of the surface 84 with the frustoconical portion of the surface 80 and with the surface portions formed by the flutes 90 thus forming a sinuous edge annularly disposed about the axis 22.

Because the flutes are spaced circumferentially apart, the cutting edge 92 is formed by alternating cutting edge segments 92*a*, 92*b*. The edge segments 92*a* are defined by intersections of the frustoconical portion of the surface 80 and the surface 84 to form circularly curved arc segments centered on the axis 22. The edge segments 92*b* are formed by the intersections of the surface 84 and the flutes 90 and form arcuate edge segments having smaller radii of curvature than the segments 92*a*. In the embodiment of the invention disclosed by FIGS. 4 and 5 the radii of curvature of the segments 92*b* vary continuously proceeding from one end of each segment 92*b* to the other.

In the embodiment of the invention illustrated by FIGS. 3–6, each flute 90 is cylindrically curved about an individual longitudinal flute axis 94 (FIG. 3). Each flute axis 94 is skewed with respect to the blade axis 22. In the illustrated knife, each flute axis 94 lies in a plane that is parallel to, and spaced a predetermined distance from, a plane containing the axis 22 and a radial line through the ring blade. One such flute axis plane is illustrated by the line segments P1 in FIGS. 1 and 2. The associated plane containing the axis 22 and the radial line is illustrated by the line segments P2 in FIGS. 1 and 2. The predetermined offset distance between the planes P1, P2 is indicated by the reference character D.

Each flute axis 94 also inclines relative to the axis 22 and the inner blade surface 80 with which it is aligned so that the intersection of the inner surface 80 and the flute forms a canted parabola when viewed in elevation (as in FIGS. 1, 2 and 4). The flutes 90 are preferably formed by a relatively small diameter grinding wheel 95 having a toroidally curved outer periphery 96 (see FIG. 6). The grinding wheel 95 is driven to rotate and move relative to the surface 80, with the center of curvature of the grinding wheel periphery 96 forming the flute axis 94. The grinding wheel 95 creates a grinding pattern extending transverse to the edge 92. The flutes can be formed by other operations if desired. For example, the flutes can be formed by a cylindrical rotating grinding rod, oriented with its axis (the flute axis 94) slightly inclined with respect to the surface 80.

The cylindrical cut made in the face 80 is relatively deep at the projecting blade section end. For example, assuming the ring blade axis 22 is vertical and the blade section wall thickness is about 0.5 mm, if the inner surface 80 defines an angle of 45° from vertical at its intersection with the flute axis plane 72 then the flute axis may be inclined a few degrees less than 45° to leave a minimum wall thickness of about 0.2 mm at the projecting blade end.

Each cutting edge segment 92*b* presents a continuously varying radius of curvature proceeding from one edge segment 92*a* to the next succeeding edge segment 92*a* (FIG. 5). The radii of curvature of the segments 92*b* are all smaller than the radius of curvature of the segments 92*a*. In the preferred blade the radius of curvature of the edge segments 92*b* continuously decreases proceeding from one segment 92*a* to the next in the direction of blade rotation. Because the flutes 90 are cut at a skew angle into the conical blade surface, the attack angle of each edge segment 92*b* varies continuously proceeding along each edge segment 92*b*. That is to say, when the knife 10 moves in a straight line while cutting a body of meat, each edge segment 92*b* bites into the meat at an angle that varies proceeding along the segment. Each intervening segment 92*a*, on the other hand, bites into the meat at an angle that is constant proceeding along the segment.

Referring to the blade illustrated by FIGS. 1–5, the intersections of the flutes 90 with the surface 80 define lines that end at the intersections 92*c*, 92*d* of the blade edge segments 92*a*, 92*b*. These intersections form points 98 where the blade edge 92 abruptly changes direction as its radius of curvature abruptly changes. Knives equipped with blades constructed so that the sinuous edge 92 defines points 98 are particularly adept at slicing and trimming meat at temperatures around 40° F. At those temperatures, which commonly exist in meat packing facilities where fat is being trimmed, fatty tissue hardens and strongly resists slicing by conventional annular rotary power knife blades. Blades such as those referred to and illustrated by FIGS. 2–5 cut through the hardened fatty tissue with surprising ease. Operator fatigue is greatly reduced. It should be noted that the new ring blade can be sharpened in the same manner conventional blades are sharpened. The planar surface 84 is run on an abrasive sharpener surface and a steel is held against the frustoconical inner surface 80 in the usual manner to deburr the edge.

Figure 7:
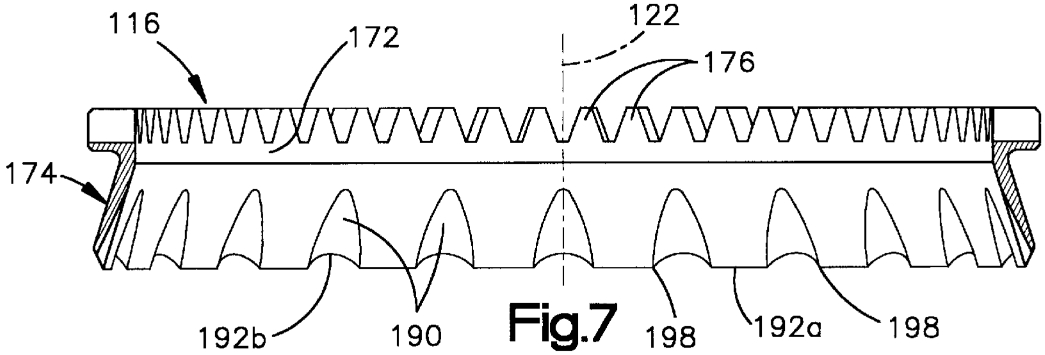
FIG. 7 is a cross sectional view of a modified knife blade constructed according to the present invention.
Figure 8:
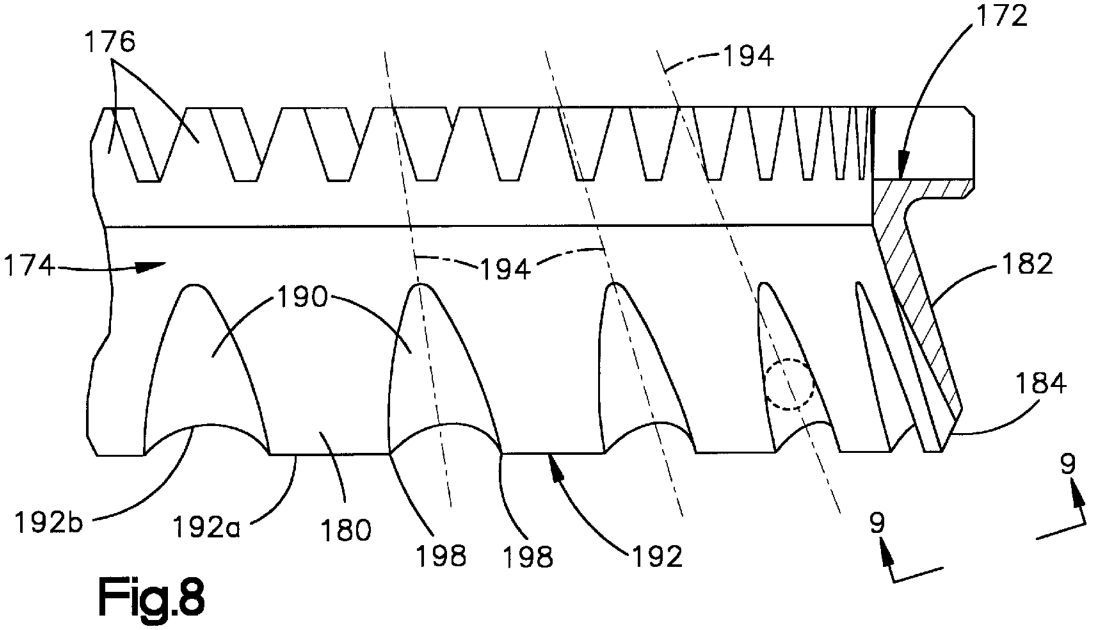
FIG. 8 is an enlarged fragmentary view of part of the blade of FIG. 7.
Figure 9:
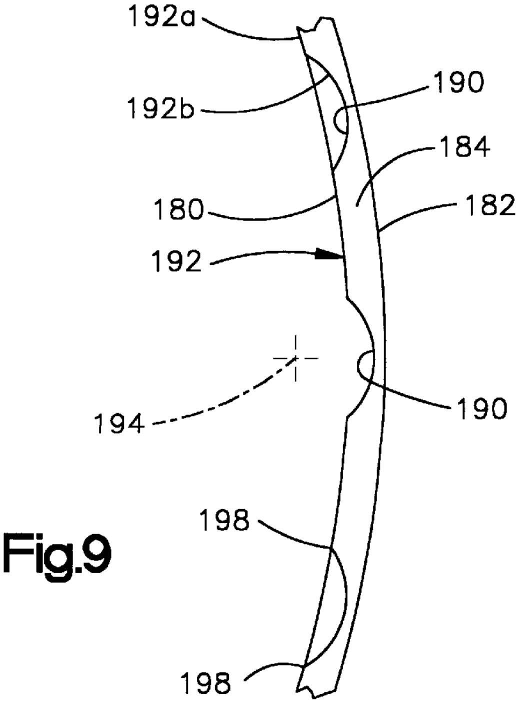
FIG. 9 is a view seen approximately from the plane indicated by the line 9—9 of FIG. 8.

FIGS. 7–9 feature a modified ring blade 116 constructed according to the invention. The ring blade 116 is constructed for use with a hand knife such as that illustrated in U.S. Pat. No. 4,509,261, for example. As shown in the Figures, the blade 116 comprises an annular body 172 disposed about a central axis 122 and an annular blade section 174 projecting from the body 172. In the illustrated embodiment of the invention the body 172 defines a plurality of gear teeth 176 projecting axially away from the body to form a ring gear so that when the knife motor operates, the ring gear is driven about the axis 122.

The blade section 174 is so constructed and arranged that it slices through the meat with great efficiency, minimizing both operator effort and the frictional forces resisting slicing while maximizing the time between blade sharpenings. Referring to FIGS. 7–9, the blade section 174 comprises a first, radially inner surface 180, a second, radially outer surface 182, and a cutting edge 192 at the projecting end of the blade section that forms a sinuous line extending about the central axis 122. In the illustrated embodiment, a third surface 184 extends between the first and second surfaces remote from the body and a plurality of flutes 190 forms part of one of the first and second blade section surfaces.

The illustrated blade section 174 projects axially from the body 172 and radially outwardly away from the axis 122. The inner and outer surfaces 180, 182 are concentric about the axis 122, generally frustoconical and extend parallel to each other from the body 172. The blade section 174 thus forms a thin frustoconical wall projecting from the blade body. The surface 184 is also generally frustoconical and converges in a direction proceeding away from the body 172 so that the surfaces 180 and 184 intersect at an acute angle with their intersections forming the blade cutting edge 192.

The flutes 190 are spaced circumferentially about the blade section and extend from the projecting blade section end toward the body 172. In the preferred embodiment of the invention the flutes are defined by smoothly arcuate spaced depressions of the surface 180 so that the surface 180 is generally frustoconical but comprises spaced flute-like depressions. The flutes have their maximum depths where they intersect with and open into the surface 184. The blade cutting edge 192 is defined by the junctures of the surface 184 with the surface 180 and with the flutes 190. Because the flutes are spaced circumferentially apart, the cutting edge 192 is formed by alternating cutting edge segments 192*a*, 192*b*. The edge segments 192*a* are defined by intersections of the surfaces 180, 184. Each edge segment 192*a* is circularly curved about the axis 122.

In the preferred embodiment of the invention each flute 190 is cylindrically curved about an individual longitudinal flute axis 194. In the illustrated embodiment each flute axis lies in a plane containing the axis 122 and extending radially from the axis 122 through the ring blade. The flute axes 194 preferably extend axially and radially relative to the axis 122 (rather than at skew angles relative to the axis as in the blade of FIGS. 1–6) and all the axes intersect at about the same point. The edge segments 192*b* are formed by the intersections of the surface 184 and the flutes 190 and form arcuately curved edge segments having radii of curvature substantially smaller than the radius of curvature of the edge segments 192*a*. See FIGS. 8 and 9. Because the flute axes are disposed in respective radial planes the radii of curvature of all the blade edge segments 192*b* are the same.

The segments 192*a*, 192*b* intersect at points 198 that are believed responsible, at least in part, for improving the ability of the knife to cut through chilled meat and fat, as noted above.

The preferred ring blade 116 is provided with flutes 190 formed by rotating cylindrical grinding rods. The grinding rod is driven and rotates about its longitudinal axis as it is advanced into the blade surface 180. Grinding continues until the grinding rod axis and the flute axis 194 coextend. Although grinding rods are preferred, the flutes 190 may be formed using other methods.

Figure 10:
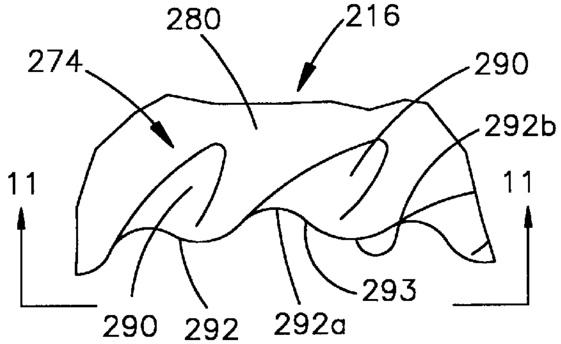
FIG. 10 is a fragmentary view similar to FIG. 4 of a knife blade similar to the blade of FIGS. 1–6 but having a further modified blade edge construction.
Figure 11:
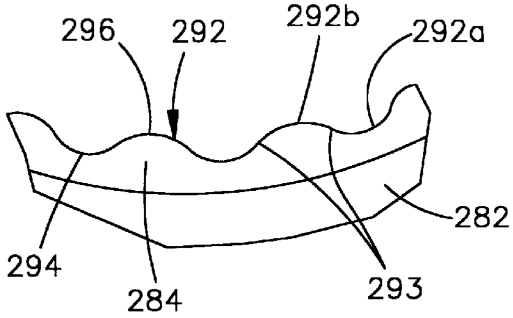
FIG. 11 is a fragmentary view seen approximately from the plane indicated by the line 11—11 of FIG. 10.

FIGS. 10 and 11 show still another rotary knife blade 216 constructed according to the invention. The blade 216 comprises an annular body having a central axis, not shown, about which the body is rotatable and an annular blade section 274 projecting from the body. The blade section 274 comprises a first radially inner surface 280, a second radially outer surface 282, and a cutting edge 292 defined along the projecting end of the blade section. The cutting edge defines a sinuous line extending about the central axis. The blade 216 is constructed like the blade 16 described in reference to FIGS. 1–6, except for the configuration of the projecting blade section end. Accordingly, only the projecting blade section end is described in detail. Further details relating to the construction of the blade 216 can be found in the description of FIGS. 1–6.

The sinuous edge 292 defines first and second continuously curved segments 292*a*, 292*b*, respectively, and blade edge curvature inflection locations 293 joining the segments 292*a*, 292*b*. The edge 292 is smoothly continuous throughout its length. The segments 292*a* have radii of curvature centered radially inwardly from the edge 292 (i.e. towards the axis of blade rotation). Each second segment 292*b* is interposed between adjacent first segments 292*a*. The second segments 292*b* have radii of curvature centered radially outwardly from the edge 292. The first and second segments are joined by blade edge curvature inflection locations 293 between each adjacent first and second segment.

The first segments 292*a* define radially outer crests 294 disposed remote from the central axis while the second segments 292*b* have radially inner crests 296 spaced radially inwardly from the outer crests 294. In the embodiment illustrated in FIGS. 10 and 11, the blade edge curvature inflection locations 293 are disposed radially between the inner and outer crests. It has been found that knife blades configured with alternating, oppositely curved inner and outer crests are highly effective in cutting relatively warm meat (e.g. uncooked meat at room temperature or somewhat above, as may be found in a meat cutting facility). Such blades have exhibited superior warm meat cutting ability compared to conventional rotary knife blades having annular cutting edges as well as the rotary knife blades described in reference to FIGS. 1–9.

Fabricating the blade 216 is essentially like fabricating the blade 16, but an additional operation is required. The rotary knife blade 216 of FIGS. 10 and 11 is initially formed like the blade 16 of FIGS. 1–6 (see FIG. 3, e.g.). The blade thus comprises inner and outer surfaces 280, 282, the skewed flutes 290 formed in the inner surface 280, and the surface 284 extending between the surfaces 280, 282 to form the blade edge. The blade 216, thus formed, is assembled to a rotary knife and run with a cylindrical or generally similarly curved abrasive member (not shown) firmly contacting the inner terminus of the projecting blade end section. The abrasive member can be a grinding rod, a file or a steel sufficiently rugged to transform the blade edge points into smoothly curved inner crests as well as to form the blade curvature inflection locations 293. The inflection locations 293 are preferably formed so that they are disposed substantially annularly about the central axis.

The inner crest and curvature inflection location forming operation may be accomplished by running the knife blade in opposite directions of rotation while engaged by the abrasive member. Thus formed, each curvature inflection location 293 is defined by a third blade edge line segment that is tangent to the first segment at the juncture of the first segment and the third segment and tangent to the second segment at the juncture of the second segment and third segment.

An alternative method of forming the blade edge 292 is to form the flutes with a grinding wheel in a manner similar to that illustrated in FIG. 3. In the alternative method, the outer wheel peripheral surface is contoured to form the inner crests 296 and the blade curvature inflection locations 293.

Figure 12:
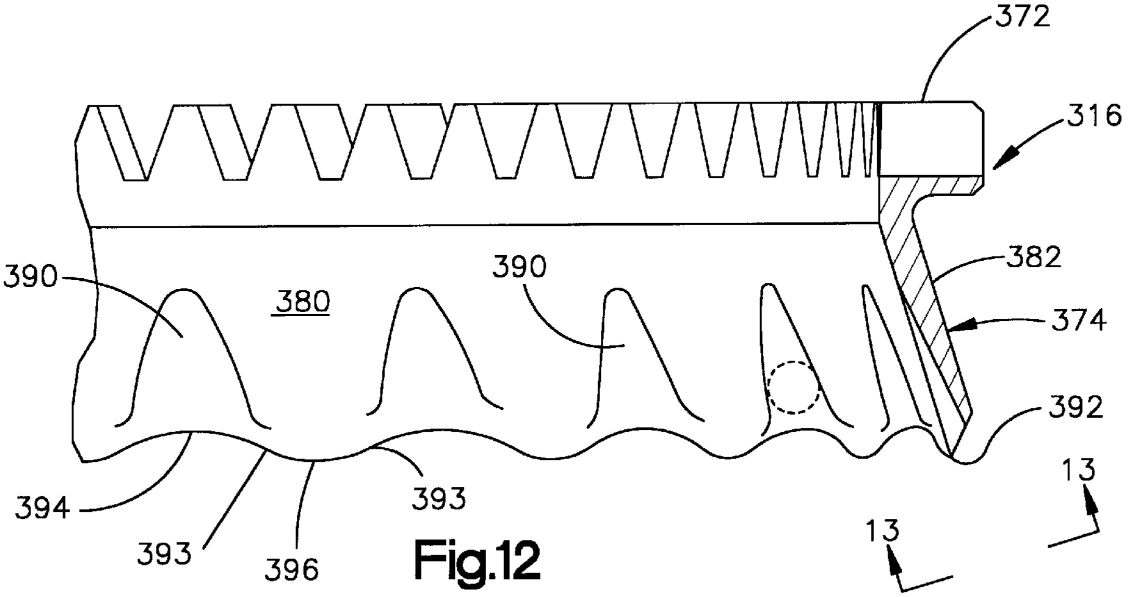
FIG. 12 is a fragmentary view of a knife blade similar to the blade of FIGS. 7–9 having a further modified blade edge construction.
Figure 13:
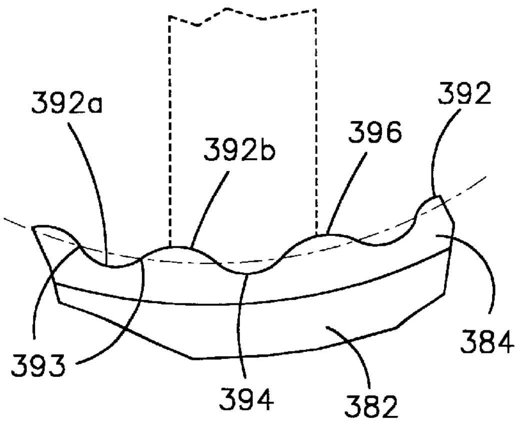
FIG. 13 is a view seen approximately from the plane indicated by the line 13—13 of FIG. 12.

FIGS. 12 and 13 illustrate a rotary knife blade 316 similar to the blade 116 of FIGS. 7–9 except for the end of the projecting blade section 374, including the blade edge 392. The blade 316 comprises an annular body 372 having a central axis, not shown, about which the body is rotatable and the annular blade section 374 projecting from the body. The blade section 374 comprises a first radially inner surface 380, a second radially outer surface 382, and a cutting edge 392 defined along the projecting end of the blade section. The cutting edge 392 defines a sinuous line extending about the central axis. Only the projecting blade section end is described in detail because the blade 316 is otherwise constructed like the blade 116 described in reference to FIGS. 7–9. Further details relating to the construction of the blade 316 can be found in the description of FIGS. 7–9.

The sinuous edge 392 defines first and second continuously curved segments 392*a*, 392*b*, respectively, and blade edge curvature inflection locations 393 joining the segments 392*a*, 392*b*. The edge 392 is smoothly continuous throughout its length. The segments 392*a* have radii of curvature centered radially inwardly from the edge 392 (i.e. towards the axis of blade rotation). Each second segment 392*b* is interposed between adjacent first segments 392*a*. The second segments 392*b* have radii of curvature centered radially outwardly from the edge 392. The first and second segments are joined by blade edge curvature inflection locations 393 between each adjacent first and second segment.

The first segments 392*a* define radially outer crests 394 disposed remote from the central axis while the second segments have radially inner crests 396 spaced radially inwardly from the outer crests 394. In the embodiment illustrated in FIGS. 12 and 13, the blade edge curvature inflection locations 393 are disposed radially outward of the inner crests and radially inward of the outer crests. The illustrated crests 394, 396 are equally spaced around the blade so that the edge 392 resembles a sine wave wrapped into a circular shape (see FIG. 13).

The rotary knife blade 316 of FIGS. 12 and 13 is initially formed like the blade 116 of FIGS. 7–9 (see FIG. 7, e.g.). The blade thus comprises inner and outer surfaces 380, 382, the flutes 390 formed in the inner surface 380 and the surface 384 extending between the surfaces 380, 382 to form the blade edge 392. The blade 316 is assembled to a rotary knife and run with a cylindrical or generally similarly curved abrasive member (not shown) firmly contacting the inner terminus of the projecting blade end section. The abrasive member can be a grinding rod, a file or a steel sufficiently rugged to transform the blade edge points to smoothly curved inner crests as well as to form the blade curvature inflection locations 393. The inflection locations 393 are preferably formed so that they are disposed substantially annularly about the central axis. The inner crest and curvature inflection location forming operation may be accomplished by running the knife blade in opposite directions of rotation while engaged by the abrasive member. Thus formed, each curvature inflection location 393 is defined by a third blade edge line segment that is tangent to the first segment 392*a* at the juncture of the first segment and the third segment and tangent to the second segment 392*b* at the juncture of the second segment and third segment.

An alternative method of forming the blade edge 392 is to form the flutes 390 with a grinding wheel contoured to form the inner crests 396 and the blade curvature inflection locations 393. Such a wheel is illustrated in broken lines in FIG. 13.

Figure 14:
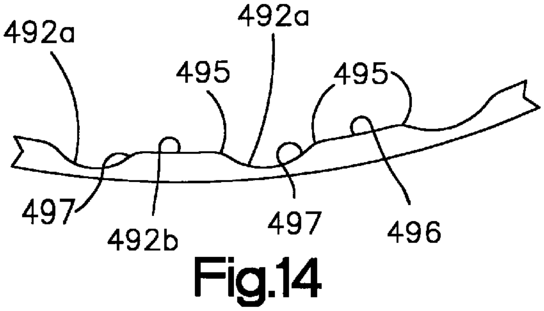
FIG. 14 is a fragmentary view, similar to FIG. 9, showing a further modified blade edge.

FIG. 14 illustrates still another modified blade that is similar to the blade of FIGS. 12 and 13 except that the blade segments 492_a_ are spaced substantially apart circumferentially with the intervening edge segments 492_b_ each defining end portions 495 having radii of curvature centered radially outwardly from the edge and an intervening crest 496 curved about the central axis (not shown). The blade segments 492_a_, the end portions 495 and the intervening curvature inflection locations 497 may be formed by any of the methods referred to above.

While several embodiments of the invention have been illustrated and described in considerable detail, the present invention is not to be considered limited to the precise constructions disclosed. Various adaptations, modifications and uses of the invention may occur to those skilled in the art to which the invention relates. The intention is to cover all such adaptations, modifications and uses falling within the scope or spirit of the annexed claims.

Having described my invention I claim:

1. A rotary knife blade comprising:

an annular body having a central axis about which the body is rotatable;

an annular blade section projecting from said body, said blade section comprising;

a first radially inner surface;

a second radially outer surface; and, a cutting edge defined along the projecting end of said blade section;

said cutting edge defining a sinuous line extending about said central axis and defining;

first continuously curved segments having radii of curvature centered radially inwardly from said edge, said first segments defining radially outer crests disposed remote from said central axis; and, second continuously curved segments, each interposed between adjacent first segments, and having radii of curvature centered radially outwardly from said edge, said second segments defining radially inner crests spaced radially inwardly from the radially outer crests and radially outwardly from the central axis.

2. The blade claimed in claim 1 wherein said cutting edge further comprises a blade edge curvature inflection location between each adjacent first segment and second segment.

3. The blade claimed in claim 2 wherein said inflection locations are disposed radially inwardly from said outer crests and radially outwardly from said inner crests.

4. The blade claimed in claim 2 wherein said curvature inflection locations are disposed substantially annularly about said central axis.

5. The blade claimed in claim 2 wherein each inflection location is defined by a third blade edge line segment that is tangent to its respective first segment at the juncture of the first segment and the third segment and tangent to its respective second segment at the juncture of the second segment and the third segment.

6. The blade claimed in claim 1 wherein said first segments are curved about said radii of curvature centered radially inwardly from said edge throughout their lengths.

7. The rotary knife blade claimed in claim 1 wherein said second segments each define end portions adjoining respective first segments, with its respective radially inner crest disposed between said end portions.

8. The rotary knife blade claimed in claim 7 wherein said end portions are curved about said radii of curvature centered radially outwardly of said edge and said inner crests are curved about said central axis.

* * * * *